Figure 1:
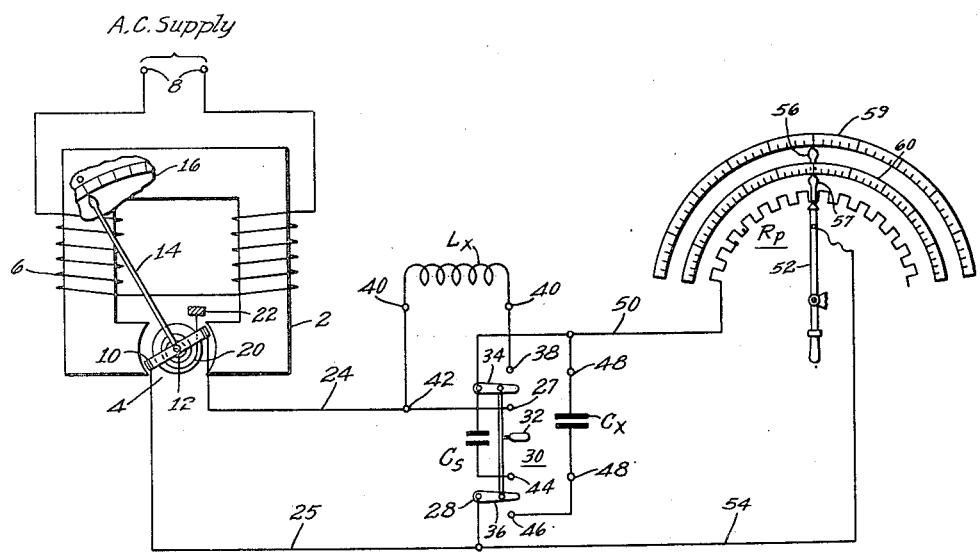

Jan. 23, 1945.    F. C. RUSHING    2,367,965
ELECTRICAL MEASURING DEVICE
Filed Nov. 21, 1941

WITNESSES:

INVENTOR
Frank C. Rushing.
ATTORNEY

Patented Jan. 23, 1945

2,367,965

UNITED STATES PATENT OFFICE 2,367,965

ELECTRICAL MEASURING DEVICE

Frank C. Rushing, Pittsburgh, Pa., assignor to Westinghouse Electric & Manufacturing Company, East Pittsburgh, Pa., a corporation of Pennsylvania Application November 21, 1941, Serial No. 419,970

5 Claims. (Cl. 175—183)

The present invention relates to an electrical measuring device and it has particular relation to a device and arrangement which is suitable for measuring either inductance or capacitance.

While there are certain well known methods for making these measurements most of these prior art arrangements are subject to disadvantages of which the present invention is free. For example, the prior art measuring arrangements using direct current have never been considered fully satisfactory for most purposes and in addition comparison arrangements of this general type are known to be subject to inaccuracies depending upon the skill of the operator. In addition bridge methods of measurement frequently require the use of adjustable inductances and capacitances. Such elements are not only difficult to calibrate initially but their actual values often cannot be determined accurately when the bridge is in balanced condition.

The present invention relates to a device which is adapted to measure either inductance or capacitance and in which the measured value may be determined as a factor of the adjusted value of a variable resistance or a rheostat. Briefly, the device comprises a movable coil located within a pulsating electro-magnetic field and biased to such a position therein that a voltage is induced as a result of the fluctuations of the field. A circuit including inductance and capacitance as well as a variable resistance is connected to be traversed by the current resulting from this induced voltage. The resistance is so connected that it may be adjusted to bring the current through the coil to quadrature relationship with the field or flux inducing it so that no torque is produced and the coil assumes its zero position. At this time the value of either reactance producing quantity may be expressed in terms of the other and the adjusted value of the resistance without involving a term dependent on the frequency.

It is accordingly an object of the present invention to provide an improvement in the art of measuring inductance and capacitance.

Another object of the invention is to provide a novel and improved device for measuring reactance producing quantities.

Still another object of the invention is to provide a device which may be employed to measure either inductance or capacitance and is substantially independent of the frequency of the energizing current.

Figure 2:
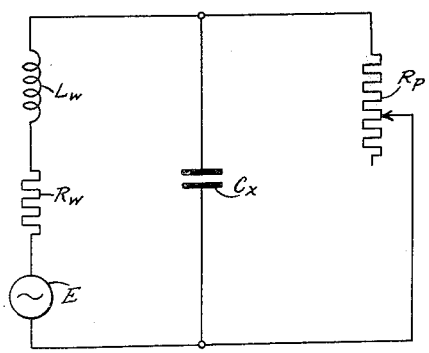

Other objects and advantages of the invention will appear from the following detailed description read in connection with the accompanying drawing in which:

Figure 1 is a schematic diagram of a measuring device embodying the invention; and Fig. 2 is a circuit diagram for use in explaining the operation of the device of Fig. 1.

Referring to Fig. 1 of the drawing, the device comprises a magnetizable core 2 having an air gap 4 therein. This core may be made up of laminated high quality magnetizable material such, for example, as that material described in United States Patent No. 1,807,021 to Yensen and sold under the trade name Hipernick. A split coil 6 is disposed about the arms of this core and connected for energization from an alternating current voltage supply 8 which may, for example, be of the usual 60 cycles at 110 volts.

Within the air gap 4 of the magnetizable core is disposed a movable coil 10 which is preferably mounted therein in a usual manner at 12 and carries an indicating needle 14. A scale 16 is preferably provided for cooperating with the needle to indicate the position of the coil 10. A flexible spring 20, which is preferably relatively weak to provide maximum sensitivity is attached to a stationary portion 22 of the device onto the coil 10 to bias the latter to a predetermined zero position in which an alternating current voltage is induced therein as a result of the pulsating flux passing across the air gap.

Conductors 24 and 25 extend from the coil 10 to switch contacts 27 and 27 of a switch designated generally as 30. This switch 30 is preferably of the double pole, double throw type including an operating handle 32 and movable plates 34 and 36, respectively. The upper contact member 34 of the switch is arranged to selectively engage either the previously mentioned contact 27 or another stationary contact 38 which is connected to one of a pair of terminals 40 adapted for engaging an inductive reactance $L_x$ which is to be measured. The other of the terminals 40 is connected to the conductor 24 as at 42.

The lower conducting plate 36 of the switch is adapted for connection to either of a pair of stationary contacts 44 and 46. The upper of these contacts 44 is connected to one end of a standard capacitor $C_s$, the other end of which engages the first switch contact plate 34. The stationary contact 46 is connected to one of a pair of terminals 48 which are arranged to connect the capacitor $C_x$ to be measured into the circuit.

The other terminal 48 engages a conductor 50 extending from the switch plate 34 to one end of an adjustable resistance or rheostat $R_p$ having a movable arm 52. This movable arm acts as the other terminal of the resistor $R_p$ and is connected through a conductor 54 through the switch plate 28 and the previously mentioned conductor 25.

In addition the arm 52 includes a pair of pointers 56 and 57 which are arranged to cooperate with scales 59 and 60, respectively. These scales may be arranged to indicate in units representing inductance and capacitance, since the adjusted position of the arm 52 represents the magnitude of whichever of these elements is being measured as will be pointed out more fully hereafter.

The wiring diagram of Fig. 2 will be used in explaining the theory of the operating of the device previously described. In this diagram the device is represented in its condition when the switch 30 is in its lower position for measuring the magnitude of the capacitive reactances $C_x$. The inductance $L_x$ is consequently out of the circuit.

In Figure 2, therefore, E represents the voltage induced in the coil 10 as a result of the pulsating flux passing across the air gap in the magnetic core in the manner previously described. The pure resistance $R_w$ represents the resistance value of the coil winding while $L_w$ represents the inductance of this coil 10. The capacitance $C_x$ to be measured is thus in shunt arrangement with these coil elements, and the adjustable resistance or rheostat $R_p$ is likewise in shunt with $C_x$.

The impedance of this circuit as seen from the position E is consequently given by the following equation:

$$Z = R_w + j\omega L_w + \frac{1}{j\omega C_x + \frac{1}{R_p}}$$

It will be understood that in order for the pointer 14 to assume the zero position in the drawing, the current flowing through the coil 10 as a result of the induced voltage must be in quadrature phase relationship with the flux producing it. Otherwise, a torque will be produced which tends to move the pointer from this position. In order to bring about this phase relationship, it is consequently necessary that the reactive or $j$-component ($Zj$) of the impedance (Z) set forth above must be equal to zero. Equating this component ($Zj$) to zero the following equations are obtained.

$$\omega^2 L_w C_x^2 - C_x + \frac{L_w}{R_p^2} = 0$$

$$C_x = \frac{1 \pm \sqrt{1 - 4\omega^2 L_w^2/R_p^2}}{2\omega^2 L_w}$$

For practical purposes, the second term under the radical may be made small compared to unity since the balance value of the resistance $R_p$ can be made relatively high compared to the inductance $L_w$. Relying upon this assumption, the radical in the above expression for values of $C_x$ may be reduced to the first two terms of the corresponding binomial series, the remaining terms being negligible. The expression for values of $C_x$ then becomes:

$$C_x = \frac{1 \pm (1 - 2\omega^2 L_w^2/R_p^2)}{2\omega^2 L_w}$$

From this equation the two solutions for $C_x$ are:

$$C_x = \frac{1 - \frac{\omega^2 L_w^2}{R_p^2}}{\omega^2 L_w}$$

and $$C_x = \frac{L_w}{R_p^2}$$

Since the second quantity in the numerator of the first of the two solutions is comparatively small, it may be assumed that the first solution is approximately:

$$C_x = \frac{1}{\omega^2 L_w}$$

The first of these values wherein C is dependent upon the frequency is more or less to be expected, but the second value which gives $C_x$ in terms of $L_w$ and $R_p$ and is independent of frequency is relied upon in the present invention. It will be noted that when the value of either the capacitance or the inductance is known the other may be readily calculated at a function of $R_p$. It will likewise appear that known values may be employed as $L_w$ and $C_x$ and an unknown resistance introduced in series with the variable resistance. The unknown resistance value may then be calculated by subtracting the adjusted value of the variable resistance from the value calculated from the second formula above.

In order to measure a capacitance $C_x$ in accordance with the present invention the switch 30 of Fig. 1 is thus first disposed in its downward position to provide a circuit similar to that energized with respect to Fig. 2. With the coil 6 energized from the alternating current supply 8 the arm 52 is operated to bring the resistance $R_p$ to such a value that the moving coil 10 returns to its zero position. This condition indicates that the $j$ component of the impedance previously discussed is equal to zero and the equation $$C = \frac{L_w}{R_p^2}$$

may be applied to determine the value of the unknown capacitance $C_x$. Since the value of $L_w$, which must be known, remains constant, the dial 59 may be so marked as to provide an indication of the capacitance in the proper units without individual calculation being necessary for each capacitance measured.

In using the apparatus for measuring an unknown inductance $L_x$, the switch 30 is disposed in its upper position so that $L_x$ is in series relationship to the coil 10 and its inherent inductance $L_w$. At the same time the lower contact 36 of the switch places the standard capacitive reactance $C_s$ in shunt relationship across this series circuit and the adjustable resistor $R_p$. In this circuit the same general relationships with respect to Fig. 2 hold but it must be remembered that the value of $L_w + L_x$ must be substituted for $L_w$ alone in the preceding equations, and that the balance value of the resistor $R_p$ preferably should be large compared to the sum of the inductances $L_w + L_x$. Thus the following equation applies:

$$C_s = \frac{L_w + L_x}{R_p^2}$$

This equation gives $L_x$ in terms of the reactance of the standard condenser, the known inductance of the coil 10 and the adjustment of the rheostat $R_p$ which is necessary to bring the coil to its zero position as previously described with respect to capacitance measuring. As a consequence the scale 60 with which the indicator pointer 57 cooperates may be calibrated to read in units of inductance.

From the foregoing, it will appear that the present invention provides a relatively simple and convenient arrangement for measuring either inductance or capacitance. In fact the same apparatus may be readily adapted for either type of measurement. Another particular feature of the invention resides in the fact that the measurement is substantially independent of changes in frequency so long as the conditions described in the specification are complied with.

While the invention with reference to pure inductances and capacitances it will be understood that the resultant values of circuits including both types of elements may be measured in the same manner as a pure element of the type which predominates.

It will be evident that various modifications may be made in the apparatus shown and described by way of example and it is consequently intended that it shall be limited only by the spirit and scope of the appended claims.

I claim as my invention:

1. In a device for measuring an electrical reactance producing quantity, a magnetizable core having an air gap therein, means for magnetizing said core to provide an alternating flux across said air gap, an inductive movable coil in said air gap, means biasing said movable coil to a predetermined position cutting said flux to have an alternating current induced therein, a series circuit having said movable coil therein, said series circuit having an inductive quantity equal at least to that of said movable coil, a capacitive quantity, means connecting said capacitive quantity in parallel with said series circuit, an adjustable resistance of a large magnitude compared to said inductive quantity, the magnitude of one of said quantities being known while the magnitude of the other is to be measured, and means connecting said adjustable resistance in parallel with said capacitive quantity for adjustment of the phase of the current in said movable coil to bring it to said predetermined position.

2. In a device for measuring an electrical reactance producing quantity, a magnetizable core having an air gap therein, means for magnetizing said core to provide an alternating flux across said air gap, a movable coil having a known inductive reactance producing component, means biasing said movable coil to a predetermined position cutting said flux to have an alternating current voltage induced therein, a series circuit connected to include said movable coil and including means for selectively connecting an inductance to be measured in series therewith, a standard capacitance, a shunt circuit connected across said series circuit and including means operable to selectively connect either said standard capacitance or a capacitance to be measured therein, an adjustable resistance having a value relatively great compared to the magnitude of said inductance, and means connecting said resistance in parallel across said shunt circuit for adjustment to bring said coil to said predetermined position when either one of the quantities to be measured is selectively connected in its corresponding circuit.

3. In a device for measuring electrical reactance producing quantities, a magnetizable core having an air gap therein, means for magnetizing said core to provide an alternative flux across said air gap, a movable coil having a known inductance component, means biasing said movable coil to a predetermined position cutting said flux to have an alternating current voltage induced therein, a series circuit connected to include said movable coil and including a first switch means for selectively connecting an inductance to be measured in series therewith, a standard capacitance, a shunt circuit connected across said series circuit and including a second switch means for connecting either said standard capacitance or a capacitance to be measured therein, means for operating said switch means in unison so that only one of the quantities to be measured is operatively connected in its corresponding circuit at one time, an adjustable resistance having a value relatively great compared to the magnitude of said inductance, means connecting said resistance in parallel across said shunt circuit for adjustment to bring said coil to said predetermined position, and means including an indicating dial operatively associated with said resistance to indicate the value of the quantity being measured as a function of the adjustment thereof when the coil is in its said predetermined position.

4. A capacitance measuring device comprising a magnetizable core having an air gap therein, means for magnetizing said core to produce an alternating flux across said air gap, a movable coil disposed in said air gap, means biasing said movable coil to a predetermined position cutting said flux to have an alternating current voltage induced therein, conductor means for connecting a capacitor whose capacitance is to be measured in parallel circuit with said movable coil, an adjustable resistance, the circuit including said coil and said conductor means having an inductance component of a small value compared to the magnitude of said resistance, and means connecting said resistance in parallel across said coil and conductor means for adjusting the phase of the current through said coil to bring it to said predetermined position in which the capacitance of a capacitor connected for measurement is a function of the magnitude of said resistance.

5. An inductance measuring device comprising a magnetizable core having an air gap therein, means for magnetizing said core to produce an alternating flux across said air gap, a movable coil disposed in said air gap, means biasing said movable coil to a predetermined position cutting said flux to have an alternating current induced therein, means for connecting an inductance to be measured in series circuit with said movable coil, a standard capacitor, means connecting said capacitor in parallel with the series circuit including said movable coil and said means for connecting the inductance therein, an adjustable resistance of considerably greater magnitude than that of the inductance to be measured, and means connecting said resistance in parallel across said capacitor for adjusting the phase of the current through said coil to quadrature relation with the flux producing it wherein the magnitude of the inductance being measured is a function of the magnitude of said resistance.

FRANK C. RUSHING.